(No Model.) 2 Sheets—Sheet 1.

A. DUBREUIL.
DRIVING MECHANISM FOR BICYCLES.

No. 555,684. Patented Mar. 3, 1896.

Witnesses
Arthur Dubreuil, Inventor
By his Attorney (No Model.) 2 Sheets—Sheet 2.

A. DUBREUIL.
DRIVING MECHANISM FOR BICYCLES.

No. 555,684. Patented Mar. 3, 1896.

Witnesses
G. Patinaude
F. C. Laberge.

Arthur Dubreuil, Inventor

By Attorney, J. A. Marion.

UNITED STATES PATENT OFFICE.

ARTHUR DUBREUIL, OF MONTREAL, CANADA.

DRIVING MECHANISM FOR BICYCLES.

SPECIFICATION forming part of Letters Patent No. 555,684, dated March 3, 1896.

Application filed November 16, 1895. Serial No. 569,127. (No model.) Patented in Canada October 17, 1895, No. 50,304.

*To all whom it may concern:*

Be it known that I, ARTHUR DUBREUIL, a citizen of the Dominion of Canada, residing at Montreal, in the county of Jacques Cartier and Province of Quebec, Canada, have invented certain new and useful Improvements in Driving Mechanism for Bicycles, (for which I have obtained a patent in Canada, No. 50,304, dated October 17, 1895;) and I do hereby declare the following to be a full, clear, and exact description of the invention, such as will enable others skilled in the art to which it appertains to make and use the same.

This invention relates to driving mechanism for bicycles; and it consists in the novel construction and combination of the parts hereinafter fully described and claimed.

Figure 1:
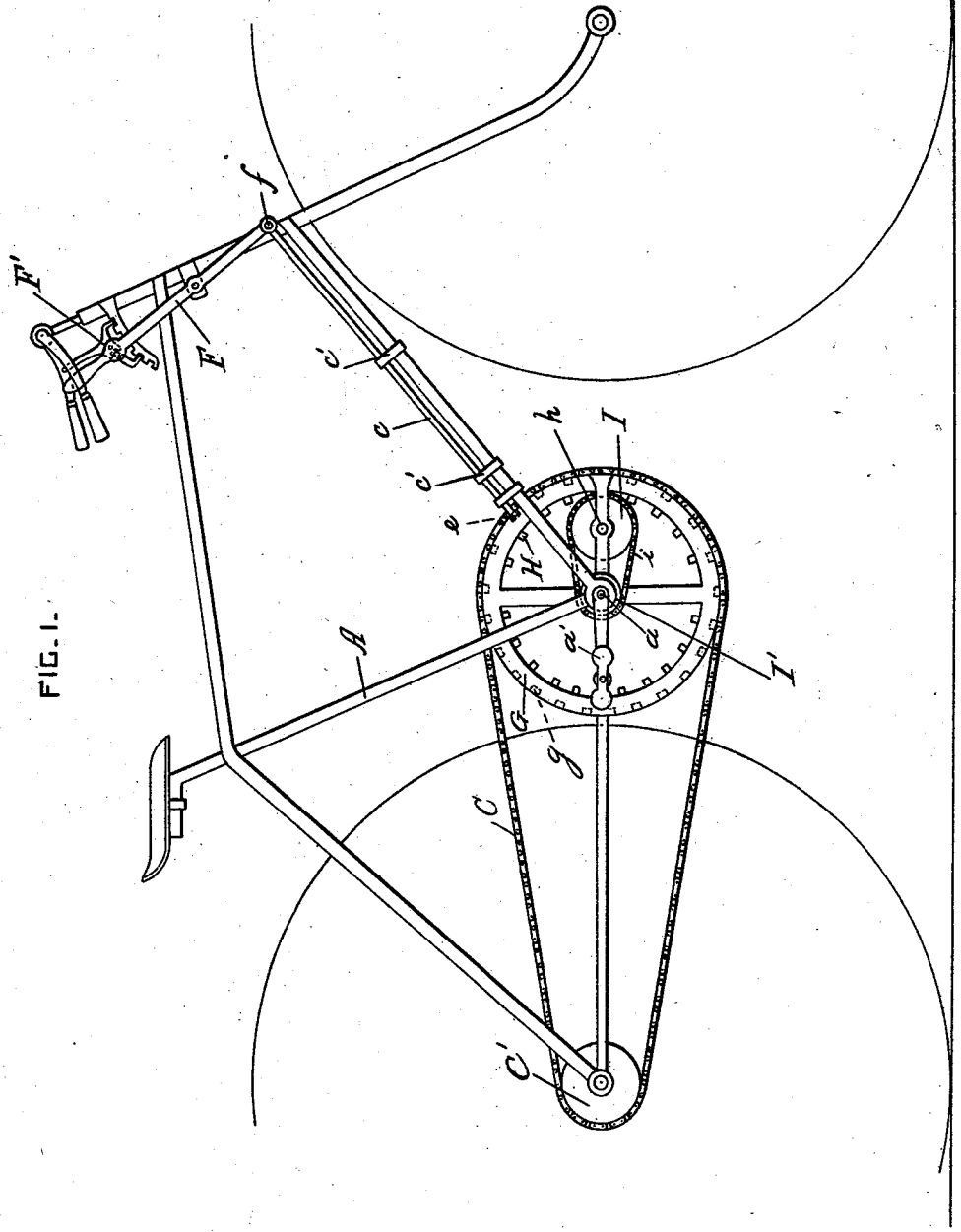
Figure 2:
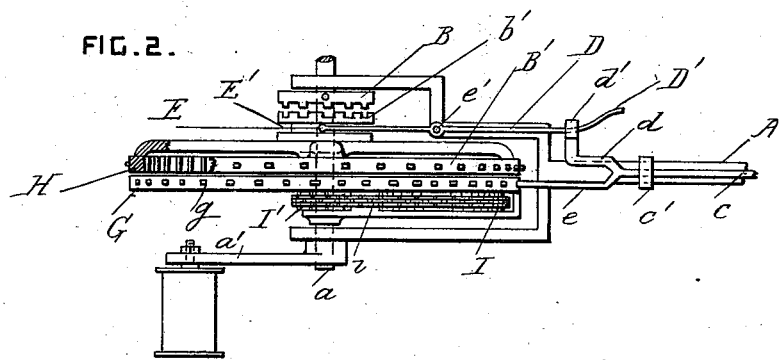
Figure 3:
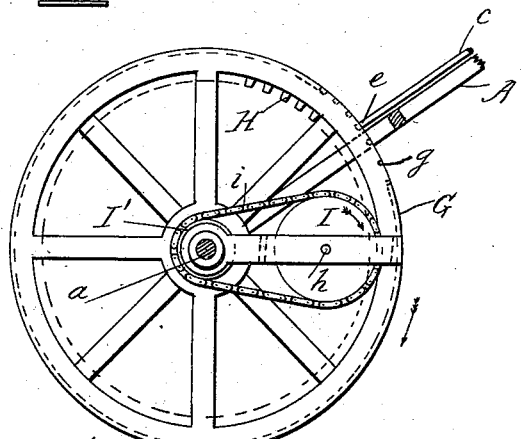
Figure 4:
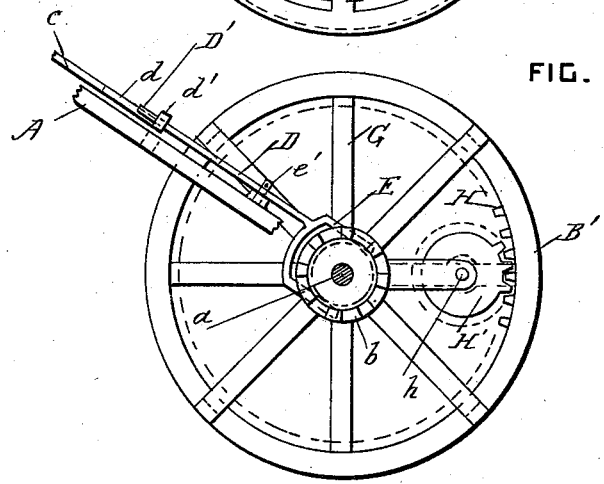

In the drawings, Figure 1 is a side view showing the outline of a bicycle provided with driving mechanism according to this invention. Fig. 2 is a plan view of the driving mechanism drawn to a larger scale. Fig. 3 is a front side view, and Fig. 4 is a rear side view, of the driving mechanism.

A is the frame of a bicycle of approved construction, and $a$ is its driving-axle journaled in the frame and provided with cranks and pedals $a'$ in the usual manner.

B is a clutch-jaw secured on the axle $a$, and B' is a drive-wheel slidable on the said axle and provided with a clutch-jaw $b'$, which may be slid into engagement with the clutch-jaw B.

C is a drive-chain which passes over the wheel B' and connects it with a similar drive or sprocket wheel C' on the rear axle of the bicycle in the usual manner.

A rod $c$ slides in guides $c'$ secured to the frame, and has two branches $d$ and $e$ at its lower end. The branch $d$ has a lateral projection $d'$ at its end which engages with the curved end D' of a lever D which is pivoted to the frame by the pin $e'$. The other end of the lever D has a forked end E which engages with a circumferential slot E' in the slidable clutch-jaw $b'$.

F is a lever pivoted to the upper part of the frame near the handle-bar, and provided with a quadrant and catch F' of approved construction for holding it in position. The lower end of the lever F is pivoted to the rod $c$ by the pin $f$.

G is a wheel journaled on the axle $a$ alongside of the drive-wheel B', and provided with mortises $g$ in its periphery.

The branch $e$ forms a stop which is slid into one of the mortises $g$ to prevent the wheel G from revolving when the rod $c$ is slid so as to disengage the two clutch-jaws.

H is an internal toothed wheel formed of the inside of the periphery of the drive-wheel B'.

H' is a toothed pinion secured on a shaft $h$ which is journaled in one of the arms of the wheel G. The pinion H' gears into the wheel H, and the ends of the shaft $h$ are supported by braces formed on or secured to the wheel G. A drive-wheel I is secured on the shaft $h$ on the other side of the arm of the wheel G from the pinion H'. I' is a drive-wheel secured on the axle $a$, and $i$ is a drive-chain passing around the wheels I and I'.

When the bicycle is going uphill, the parts are in the positions shown in the drawings, and the wheel is held stationary. When the axle is revolved, the wheels I and I' and the drive-chain $i$ cause the shaft $h$ to revolve. This causes the pinion H' to revolve and drive the wheel H at a slow speed but with greater power. The drive-chain C imparts this slow speed to the rear wheel of the bicycle, and the hill is mounted without fatigue to the rider. When the rider comes to level ground or is proceeding down a hill, he slides the rod $c$ so that the two clutch-jaws are connected and the wheel G is released from the stop $e$. The driving devices then all revolve with the axle, and the power is transmitted direct from the axle to the wheel B' and the drive-chain C. This permits the bicycle to be driven at high speed, the gear for increasing the power in going uphill being thrown out of operation.

What I claim is—

1. The combination, with a driving-axle provided with a clutch-jaw, of a drive-wheel provided with external and internal teeth and a clutch-jaw and slidable on the said axle, a wheel G provided with mortises at its periphery and mounted on the said axle, a drive-wheel I' secured to the said axle, a shaft journaled in an arm of the wheel G, a toothed pinion and a drive-wheel I secured on the said shaft, a drive-chain passing over the wheels I and I', a stop for locking the wheel G when the clutch-jaws are disconnected, and means for withdrawing the said stop and moving the clutch-jaws into engagement simultaneously, and substantially as set forth.

2. The combination with a driving-axle provided with a clutch-jaw, of a drive-wheel provided with external and internal teeth and a clutch-jaw and slidable on the said axle, a pivoted lever provided with a curved end for sliding the slidable clutch-jaw into engagement with the clutch-jaw on the shaft, a wheel G provided with mortises on its periphery and journaled on the said axle, a drive-wheel I' secured to the said axle, a shaft journaled in an arm of the wheel G, a toothed pinion and a drive-wheel I secured on the said shaft, a drive-chain connecting the wheels I and I', and a slidable rod provided with a stop for locking the wheel G and a lateral projection for operating the curved end of the clutch-lever, substantially as set forth.

In testimony whereof I affix my signature in presence of two witnesses.

ARTHUR DUBREUIL.

Witnesses:
F. C. LABERGE,
T. J. PATENAUDE.